Oct. 29, 1968

W. T. KNAUTH 3,407,661

APPARATUS FOR TOTALIZING LIQUID VOLUMES
IN A PLURALITY OF CONTAINERS

Filed Aug. 4, 1967

WALTER T. KNAUTH
INVENTOR

BY Wm. E. Ford

ATTORNEY

United States Patent Office 3,407,661
Patented Oct. 29, 1968

3,407,661
APPARATUS FOR TOTALIZING LIQUID VOLUMES IN A PLURALITY OF CONTAINERS
Walter T. Knauth, 1334 W. Gray, Houston, Tex. 77019
Continuation-in-part of application Ser. No. 451,457, Apr. 28, 1965. This application Aug. 4, 1967, Ser. No. 658,534
8 Claims. (Cl. 73—311)

ABSTRACT OF THE DISCLOSURE

The invention comprises a system which constantly totalizes liquid volumes in a plurality of vessels. A flexible sack of fluid is floated in each vessel for determining the level of liquid therein, and a fluid sensing system transmits the level indication from each float through flexible conduit means to a remote transducer. A lever system totalizes the levels of the various tanks in a single indication.

---

The invention relates to apparatus for totalizing liquid volumes of containers, a flexible sack of fluid being floated in a respective container and is connected to reflect within a bellows interior comparable to the liquid level in the container in which the sack floats. Each bellows movement pivots a lever means, and respective lever means are so connected and calibrated to act upon indicators in manner that the additive totals of liquid volumes in a plurality of containers may be indicated; this application being a continuation in part application of United States patent application Ser. No. 451,457, filed Apr. 28, 1967, for Apparatus for Totalizing Liquid Volumes in a Plurality of Containers, and now abandoned.

The invention also relates to apparatus for indicating the volume of a liquid in a container, as a tank, conduit or pond, the volume being indicated in terms of hydraulic fluid pressure head between a flexible sack or diaphragm means floated by the liquid volume to be measured and either atmospheric air or sensing diaphragm means as a flexible sack at a reference elevation.

As a primary object the invention provides apparatus and method of indicating cumulatively the volumes of a plurality of liquid containers, the volume of each container being indicated as a function of hydraulic fluid pressure differential between a flexible sack or sensing diaphragm floated on the liquid in a respective container and a flexible sack or sensing diaphragm at a reference elevation, the pressure differential change in each case being translated into motion of a resilient means spaced in the hydraulic fluid between said flexible sack or sensing diaphragms, and the responsive motions in each case being calibrated by connection to an indicator which indicates cumulatively the total of the liquid volumes of the containers.

It is also another most important object of the invention to provide apparatus and method of this class which indicated continuously the volume of fluid in a tank, conduit, pond, or container of any type as a function of hydraulic fluid pressure differential between a flexible sack or sensing diaphragm floated on the liquid to be measured and a flexible sack or sensing diaphragm at a reference elevation, the pressure differential change in each case being translated into motion of a resilient means spaced in the hydraulic fluid between said flexible sacks or sensing diaphragms, and the movement of the resilient means being translated into motion of leverage means externally thereof connected to move an indicator calibrated to indicate the liquid volume on a dial directly responsive to resilient means movement.

It is also a further object of the invention to provide apparatus and method of this class in which resilient means movement is translated to the exterior of the hydraulic system by a lever extending from the resilient means through a pivot sheath which also seals against leakage from the hydraulic fluid system.

It is also another object of this invention to provide apparatus and method of this class in which for each container the resilient means, interposed between the two hydraulic systems terminating in respective floated and fixedly positioned flexible sacks or sensing diaphragms, may be positioned at any convenient predetermined location, and in which the lever which extends from the resilient means, sealably and pivotally to the hydraulic fluid system exterior, may have leverage means connected thereto at adjustably selective locations, whereby to calibrate for the respective cross-sectional area ratio of movement produced by its change of volume in the cumulative total volume indicated for a plurality of measured containers.

It is another and primary object of this invention to provide apparatus for indicating cumulatively the volumes of a plurality of liquid containers, the volume of each container being indicated as a function of the liquid level of the respective container acting upon a liquid piston drive to urge an air signal within a bellows as surrounded by the atmosphere, each bellows moving lever means connected into an arrangement which actuates a totalizing indicator.

It is also another and important object of this invention to provide apparatus of the aforesaid liquid piston drive type in which liquid extends from a flexible sack floated at container liquid level to a partially filled reservoir, at a reference elevation, wherein the air which signals the bellows is counterpoised for actuation against the reservoir liquid.

It is also another and most effective object of this invention to provide apparatus of the aforesaid liquid piston drive type which only requires a single, small diameter, capillary tube to carry instrument air from each tank sight to its respective bellows, regardless of the locale at which the bellows may be connected for measurement recordings and indicia.

Other and further objects will be apparent when the specification herein is considered in connection with the drawings, in which.

For logistical reasons and for other purposes it may be very desirable to know the total volume of liquid in a plurality of tanks, as, for instance, to calculate transportation needs to a location, or it may be desirable to have a recorded record of changes in total volume, from time to time, as may take place in the usages of any particular plurality of tanks, ponds, conduits or containers. Also it is often desirable to have such a total under constant observation, as may be accomplished by observing a totalizer indicator needle as against any calibrated dial or gauge. Also, in many cases, when only one tank or liquid container is employed, it may be desirable to have a check record, in addition to a conventional sight gauge, or as a safety device in case of the malfunction or breakage of a conventional sight gauge.

Figures 1, 2, 7, 8:
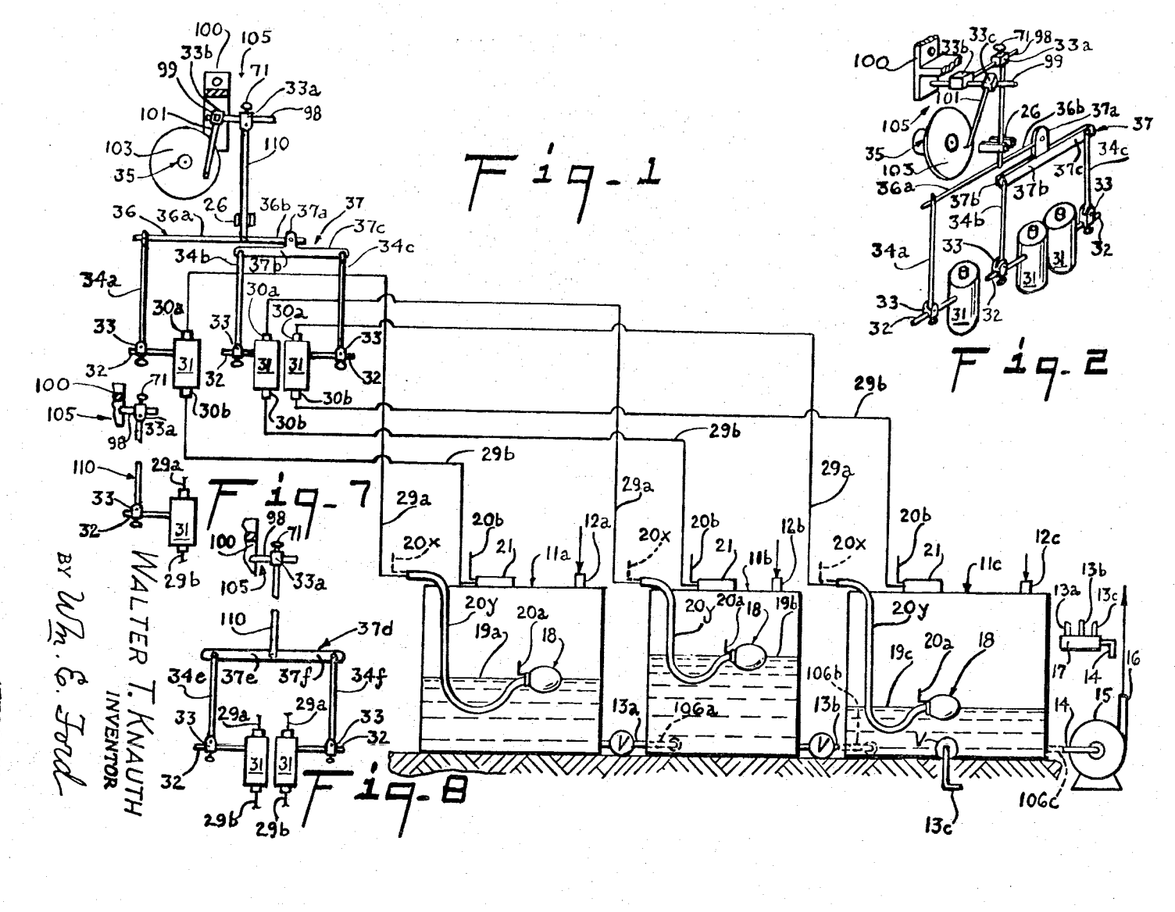
FIG. 1 is an elevational view, partially diagrammatic, showing three tanks and apparatus connecting them to a recorder in manner that the total volume of fluid in the three tanks at any instant is recorded cumulatively.
FIG. 2 is an isometric view, partially diagrammatic, showing the three hydraulic fluid compartments from the three tanks and the levers therefrom and one form of leverage mechanism whereby connection is made to a recorder in manner that the recorder indicated cumulatively the volume of liquid in the three tanks.
FIG. 7 is a fragmentary elevational view, partially diagrammatic, showing the apparatus for connecting the hydraulic fluid compartment of a single tank to the leverage which activates a recorder needle.
FIG. 8 is a fragmentary elevational view, partially diagrammatic, showing the apparatus for connecting the hydraulic fluid compartments of two tanks to the leverage which actuates a recorder needle to indicate the total volume of the tanks.

Referring now in detail to the drawings in which like reference numerals are assigned to like elements in the various views, three tanks 11a, 11b and 11c are shown in FIG. 1, which are shown to be of the same height for purposes of illustration, but of varying lengths, and which may also be assumed to be of varying widths. For illustrative purposes each tank is shown having its respective filling inlet 12, 12b and 12c, and valve controlled discharge conduit 13a, 13b and 13c, with the discharge conduits leading to a manifold 17 through which the liquids from the tanks may pass, selectively, in admixture or individually. From the manifold the liquid moves on into the suction conduit 14 to a pump 15 to be discharged down the drill string, not shown, which delivers the liquid, as drilling fluid downwardly through the drill bit to circulate back up the well bore annulus.

Giving further consideration to FIG. 1 the apparatus required to obtain continuous indications and/or records of the total volume of the three tanks 11a, 11b and 11c may be described in general as follows.

In each tank a float 18 carries a sensing diaphragm means, to be described hereinbelow, and floats on the surface of the respective liquids 19a, 19b and 19c in the tanks. A vent 20a from each float 18 places the outer side of the sensing diaphragm means (within the float 18 and thus not shown in FIG. 1) in communication with the atmosphere in cases where each tank in vented at its top to the atmosphere, as by any conventional vent means, not shown.

From the opposite or inner side of the sensing diaphragm means within the float 18 a conduit 29a (which may be at least in part flexible but not expansible and contractible) leads from the interior of each tank and connects into an upper inlet 30a in the top of a rigid container 31. The rigid containers 31 and the parts therein and extending therefrom are identically constructed and will be described in detail hereinbelow.

A stationary or fixedly positioned casing or housing 21 is shown in FIG. 1 mounted on the top of each tank, and the tanks 11a, 11b and 11c are shown to be of equal height, as aforesaid. Preferably the housing or casing 21 should be fixed in elevation above or below the respective elevations of highest or lowest liquid level range, and in FIG. 1 this elevation is at the top of the tanks, as aforesaid.

From each casing 21 a vent 20b places the outer side of sensing diaphragm means (within the casing 21 and thus not shown in FIG. 1) in communication with the atmosphere. Also, from the opposite or inner side of each cased sensing diaphragm means a conduit 29b (which may be at least in part flexible but not expansible and contractible) leads from the interior of each casing 21 and connects into a lower inlet 30b into the bottom of the respective container 31.

Figure 5:
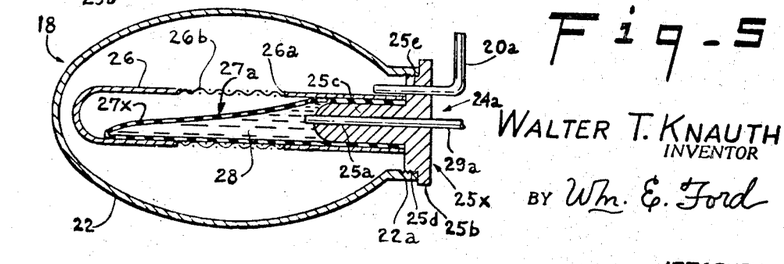
FIG. 5 is a sectional elevational view through a flexible sack, floated sensing diaphragm or collapsible tubing.

As shown in FIG. 5, each float 18 includes an egg-shaped housing or shell 22 having an internally threaded neck 22a into which a sensing diaphragm unit 24a is assembled. Such unit 24a includes a closure cap 25x having a central bore 25a therethrough, beginning in the outer face of a flange 25b and terminating in the inner end of a shank 25c. Inwardly of the flange 25b the closure cap 25x has a reduced diameter, externally threaded portion 25d for engagement with the internally threaded shell 22.

The shank 25c has the outer end of a flexible, collapsible sack or sensing diaphragm 27a inserted thereover, while a rigid or metallic tube 26, with inner end closed, has its outer end fitted snugly over the outer end of the flexible tube 27a to compress it firmly upon the shank 25c.

Thus the installation of the tube 26 completes assembly of the sensing diaphragm unit 24a. The tube 26 has slots 28 therein, which may be closed by wire mesh 28a to protect the diaphragm 27a from any extraneous matter that may enter, while letting through the atmosphere, as will be hereinbelow described, to act against the sensing diaphragm or sack 27a. A bore 25c, spaced from the central bore 25a, passes through the cap flange 25b and cap portion 25d to communicate with the shell interior, and a right angle vent tube 20a, referred to hereinabove, has one leg insertable through the bore 25c and the other leg turned upwardly to disposed the upper end thereof well above the liquid level at which the float 18 is buoyed in the liquid. The inner end 27x of the sensing diaphragm or flexible, collapsible sack 27a is closed and takes shape substantially as indicated in FIG. 5, as when the respective tank to be measured by the respective diaphragm is say half full of liquid.

Figures 3, 4, 6:
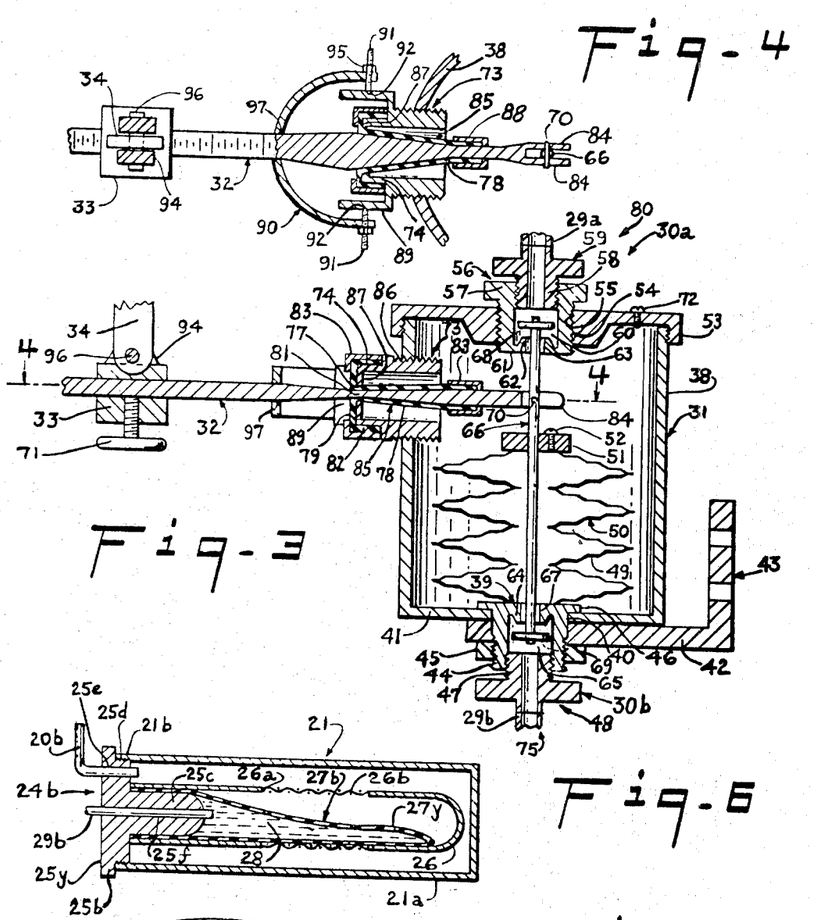
FIG. 3 is a sectional elevational view through a fluid compartment for a tank, the view also showing the bellows and the lever therefrom and the structure whereby it is passed sealably and pivotally through the wall of the compartment.
FIG. 4 is a sectional plan view taken along line 4—4 of FIG. 3.
FIG. 6 is a sectional elevational view through a cased or stationary sensing diaphragm flexible sack or collapsible tubing.

As shown in FIG. 6, each housing or casing 21 is fixed, on top of its respective tank, as shown in FIG. 1, as by a conventional clamp, not shown. Each casing 21 comprises a casing member or cup 21a and a sensing diaphragm unit 24b includes a closure cap 25y having central bore 25f therethrough, from the outer face of a flange 25b to the inner end of a shank 25c, correspondingly as shown in FIG. 5. The casing member or cup 21a has its open end 21b internally threaded to receive therein the externally threaded, reduced diameter portion 25d of the closure cap 25y by which the sensing diaphragm unit 24b is assembled into the casing 21.

A tube 26 with inner end closed has its outer end pressed tightly over the outer end of a flexible, collapsible sack or sensing diaphragm 27b, corresponding with the diaphragm 27a shown in FIG. 5. The tube 26 has slots 26a therein, covered by wire mesh 26b whereby to protect the sensing diaphragm 27b.

The inner end 27y of the sensing diaphragm or flexible, collapsible sack 27b is closed and takes shape substantially as indicated in FIG. 6, as when the respective tank to be measured by the respective diaphragm is say half full of liquid.

A bore 25c, spaced from the central bore 25f through the closure cup 25y, receives the lower leg of a vent tube 20b, referred to hereinabove, which establishes communication with the interior of the casing 21, while the upper leg of the right angle vent tube 20b turns upwardly into the atmosphere within the tank.

As stated hereinabove, the conduit 29a leads from the float 18, being connected thereinto to establish hydraulic fluid communication with the interior of the sensing diaphragm 27a, by installation in the closure cap central bore 25a, while the conduit 29b leads from the casing 21 to which it is connected by insertion of an end of the conduit 29b into the central bore 25f of the closure cap 25y to establish hydraulic fluid communication with the interior of the flexible, collapsible sack or sensing diaphragm 27b.

The floats 18 may be vented from the bores 25c in their closure caps 25a by means of flexible tubes 20x, installed in place of the right angle vent tubes 20a. In this case both the hydraulic fluid conduits 29a and the flexible tubes 20x may be installed in the sheaths 20y which are shown in FIG. 1 extending from the floats 18 to the tops of the respective tanks 11a, 11b and 11c. In this optional case the vent tubes 20x are indicated in dotted lines at the tops of the tanks.

As shown in FIGS. 3 and 4, each compartment 21 comprises a tubular body 38 with a closed lower end, an adapter plug 39 passing through a central bore 40 through the body closure 41, and through the outstanding leg 42 of a bracket 43, with the externally threaded lower end 44 of the plug 39 having a washer 45 threaded thereon to bear upon the under surface of the bracket leg 42 as a flange 46 on the upper end of the plug 39 bears upon the upper face of the closure 41, whereby the plug 39 firmly connects the compartment 31 and bracket 43. Also, the plug 39 is internally threaded within its lower end 44 to receive the externally threaded upper end 47 of an adapter fitting 48 comprising the upper end of the conduit 29b.

A conventional stiffened bellows 50 having characteristics of a diaphragm, and termed by the trade as a "belliphragm," is connected to the top of the plug 39, as by brazing or welding, the belliphragm 50 being of crimped, thin wall metal sections 49 corresponding with bellows sections. A top disc 51 is mounted on top of the upper bellows section, also as by brazing or welding, and a machine screw 52 is shown threadable through the top disc 51 to be removed to permit the escape of air which may accumulate in the bellows when it is filled with hydraulic fluid.

A top lid or closure cap 53 is threadable upon the upper end of the compartment cylinder 31. Such closure cap 53 has a central threaded bore 54 therethrough to receive the externally threaded compartment shank 55 of an upper adapter plug 56, which has as its upper element a flange 57, the flange 57 being internally threaded centrally thereof to receive the externally threaded lower end 58 of an upper adapter 59 threadably thereinto. Such upper adapter 59 comprises the lower element of the upper conduit 29a. The shank 55 of the upper adapter plug 56 has a hollow space 60 provided therein and an enclosing partition 61 across the bottom thereof defines the lower extent of such hollow space. The partition 61 has an upwardly extending boss 62 therein, and a bore 63 is provided centrally through the partition, for a purpose to be hereinbelow described.

Also, the lower adapter plug 39 has a flange or head 46 which seats within the compartment 31, and on the bottom thereof, while a downwardly extending boss 64 extends below the flange 46 to determine the upper limits of a hollow space 65 provided centrally within the plug 39. The lower limits of the space 65 are defined correspondingly as in the case of the upper adapter plug 56, by the upper face of a lower adapter 48 which comprises the lowermost element of the lower conduit 29b.

A valve stem or rod 66 passes through the bore 63 of the upper adapter plug partition 61 and through a central bore through the dis 51 to which the rod 66 is rigidly connected as by welding or brazing. Below the disc 51 the rod 66 passes through the bellows 50 and through a bore 67 through the lower adapter plug head 46 and its downwardly extending boss 64. The upper and lower ends of the valve stem 66 are of reduced diameter and at its upper end the valve rod or stem 66 has a valve element 68 press-fitted or threaded thereon to seat downwardly on the upper face of the boss 62 to close the upper boss bore 63; also, the rod 66 has a lower valve element 69 preferably initially press-fitted thereon to seat upwardly on the lower face of the boss 64 to close the bore 67 therethrough. As indicated by the heavy black lines on the contacting faces of the respective upper and lower valve elements and bosses, these faces may be coated with a material, as rubber, to provide smoother seating surfaces.

The inner end of the lever 32 is pronged or bifurcated, with the prongs 84 bored to receive the ends of a pin 70 which passes with slight clearance through a bore through the valve stem 66. The lever 32 passes sealably, pivotally outwardly through a hollow nut 73, as will be hereinbelow described, the shank 86 of the nut being threadably connected through the wall of the tubular body 38 providing the compartment 31. The outer part or head 74 of the nut is of reduced diameter and has a closure wall 87 across the outer end thereof, the wall 87 having a rectangular slot 77 provided centrally therein. A seal member 85, as of rubber, includes a resilient sheath which is slid over the lever 32 to fit snugly thereabout, including the part of the lever 81 which is of minimum depth or thickness, as shown in FIG. 3. A hold-down cup or sleeve 88 is slidable on the lever 32 to be slipped over the inner end of the sheath 78, thereby to anchor the sheath firmly on the lever 32.

The lever 32 has the plan contour shown in FIG. 4 and the elevation contour shown in FIG. 3, and thereby provides an area 81 of minimum depth or thickness at a lever fulcrum point to be hereinbelow described. The seal sheath 78 merges outwardly into a cap 79 which is turned back inwardly to provide a cylinder or flange 82 to fit snugly about the nut head 74. Outermost, a metallic cap 83, which is slotted centrally, is slid upon the lever 32 to fit tightly over the resilient sheath cap 79 and flange 82 to firmly assemble the nut 73, seal 85 and cap 83 together.

A half-ring bracket 90, slotted centrally at 97, is forced upon the lever 32 to a predetermined position where the end portions thereof overextend ears 89 which are provided on the nut head 74, as shown in FIG. 4. The ends of the bracket 90 are drilled and tapped on an axis passing through the nut closure wall 87 and receive threaded pivot pins 91 therethrough having tapered points at their inner ends to fit into countersunk pivot recesses 92 in the ears 89, whereby the lever 32 is mounted to move pivotally up and down responsive to movement of the valve stem 66 connected to the lever inner end prongs 84 within the compartment 31. Lock-nuts 95 are threaded on the outer ends of the pivot pins 91 to lock them to the bracket 90.

The lever 32 has scale graduations 93 engraved thereon whereby the distance of the axis of the connection block set screw 71 from the pivot axis 92, 92 may be measured. Also, the connection block 33 has two spaced apart lugs or bifurcations 94 on its upper side which are bored to receive the opposite ends of a pivot pin 96 passing through a journal bore in the lower end of the rod 34, whereby the rod 34 is pivotally connected to the connection block 33, as aforesaid.

The float sensing diaphragm or flexible sack 27a, the conduit 29a and the interior of the bellows 50 may be described as comprising the inner hydraulic fluid system 75, and the casing sensing diaphragm or flexible sack 27b, the conduit 29b and the interior of the compartment 31 may be described as comprising the outer hydraulic fluid system 80. Both systems 75 and 80 are filled with hydraulic fluid of the same density or specific gravity.

The two systems are each filled with hydraulic fluid to such an extent, that, with the float 18 on the bottom of an emptied tank, the hydrostatic head effective between the casing 21 and the float 18 causes the fluid system 75 to expand the bellows 50, while the fluid of the system 80 is urged and/or drawn by suction to bulge out or expand the float sensing diaphragm or flexible sack 27a. Also, the extent of filling is such that, when the float 18 is at the top of a filled tank, the effect of hydrostatic head is nullified, in which case the cased sensing diaphragm or flexible sack 27b may be bulged out or expanded in degree, while the float sensing diaphragm or flexible sack 27a is collapsed in corresponding degree.

The rod or linkage 34, shown in FIGS. 3 and 4, discloses the type of linkage that is connected to the lever 32 which transmits bellows movement from the bellows compartment 31 of each tank, however, for purposes of giving a most clarified description of the various leverage combinations which may be employed, part of which are exemplified in FIGS. 1, 7 and 8, in these figures each lever which connects to a bellows actuated lever 32 is assigned a different reference numeral.

As shown in FIGS. 1 and 2, three tanks 11a, 11b and 11c are shown with their bellows levers 32 connected to linkage means including two cross-bars 36 and 37 which act as "three movement eveners" whereby the movement of either the respective linkage 34a, 34b or 34c will transmit only one-third of its movement to a master linkage 110.

In FIG. 8 an arrangement is shown in which the levers 32 from the bellows compartments 31 of the tanks, not shown, are connected to linkage means, including a crossbar 37, which acts as a "two movement evener" whereby the movement of either the linkage 34c or the movement of the linkage 34f will transmit only one-half of its movement to the master linkage 110.

FIG. 7 shows an arrangement whereby the lever 32 from the bellows compartment 31 of a single tank, not shown, has the master linkage 110 directly connected thereto, so that the movement of the lever 32 is transmitted in full to the linkage mechanism 105.

As shown in FIGS. 1 and 2, the mechanism 105 (also indicated in FIGS. 7 and 8), includes a connection block 33a to which the upper end of the master linkage 110 is pivotally connected. The connection block 33a is slidably adjustable, for progressive adjustment, along a rod 98 which passes therethrough and terminates in a connection block 33b into which it is press-fitted. A pivot rod 99, at right angles to the rod 98, has its ends journalled in a bracket 100, the right part being omitted for purposes of clarity. A connection block 33c is slidably positionable upon the rod 99, and is rotated to any oriented position thereon, and fixedly positioned by a set-screw, not shown, to place a needle or pin arm 101 affixed in the block 33c, in recording position or contact with the dial face 103 of the recorder.

The recorder 35 is of the well known type which is rotated at even rate as a fuction of time, while the needle or indicator 101 moves across the face or dial 103 from center to periphery thereby marking it in terms of amplitude. Dial faces 103 are removable and are replaced at the end of each revolution of the recorder 35, and thereby the dials 103 may be read as a continuing record of amplitudes as plotted against time.

In the instant cases, as will be hereinbelow explained, the movement of the master linkage 110 responsive to changes in the total volumes of the three tanks 11a, 11b and 11c, and thus the amplitude line imprinted on a recorder dial 103 is in terms of total volume of liquid in the tanks, as in barrels, plotted against time.

Making reference to FIGS. 1 and 2, it may be assumed for purposes of illustration that the tanks 11a, 11b and 11c are of the same depths, and are respectively, of crosssectional areas of 280 sq. ft., 224 sq. ft. and 168 sq. ft. and of equal height, as shown. and when filled, will hold, respectively 250 barrels, 200 barrels, and 150 barrels.

With each tank full, and with its respective float 18 and casing 21 at substantially the same elevation, there will be no hydrostatic head or difference in hydrostatic pressure effective across the respective said bellows 50 of the respective compartments 31 to which each tank is connected. This is true regardless of the elevation at which any or all of the respective compartments may be placed. Under these conditions, the linkage system 105, shown in FIG. 1, between the master linkage 10 and the recorder dial face 103, is adjusted by orienting the block 33c to position the needle or pin arm 101 at the maximum or outermost reading or indicating position on the dial face 103 to indicate and/or record the total 600 barrel volume of the three filled tanks 11a, 11b and 11c.

The block 33a is now adjusted along the rod 98 so that a movement of say 600 units of vertical travel of the master linkage 110, pivotally connected at its top to the block 33a, will cause the needle 101 to move from maximum recording of 600 barrels to zero barrels minimum recording.

This 600 unit downward movement of the master linkage 110 can be divided into three equal components of 200 units each, the cross-arm part 36a causing one-third of the movement, and by virtue of the 2 to 1 ratio between cross-arms parts 36a and 36b, and by virtue of the crossbar parts 37b and 37c being of equal length, the remaining 400 unit downward movement of the levers 34b and 34c each will cause one-third or 200 units of the movement.

At this point, for purposes of illustration, it may be assumed that the three tanks are of equal cross-sectional area, and being of equal height, say five feet, each would hold 200 barrels of the total 600 barrel content of the three tanks, and thus have the same capacity rate of volume change per vertical interval. Then the float 18 in the tank 11a is lowered five feet with reference to the tank casing 21, the connection block 33, on the lever 32 from that compartment 31 which is connected to the tank 11a, is moved along the lever 32 to that position which will produce a drop of 600 units in the elevation of the linkage 34a. Then, the 600 unit movement of the linkage 34a is transmitted as 200 units movement of the master linkage 110 to indicate a 200 barrel change on the recorder chart, this being true by virtue of the 2:1 ratio of the cross-bar parts 36a and 36b, the pivot journal of the arm 37a of the "three unit evener" bars 36, 37 remaining stationary.

As to the calibration for the tanks 11b and 11c, either of their floats 18 may be lowered five feet, their respective compartment lever connection blocks 33 being moved along the respective levers 32 to position the respective block from the compartment wall pivot a distance that will produce a drop of 600 units in the respective linkage 34b or 34c. By means of the "three unit evener" bars 36, 37, the 600 unit movement of the linkage 34b or 34c is transmitted into a 200 unit movement of the master linkage 110. In these cases the linkage 34b or 34c under adjustment is moved 600 units while the top connection of the other linkage holds the pivot, and since the parts 37b and 37c are of equal length, the pivot 37a moves 300 units. Then by virtue of the 2 to 1 ratio of the parts 36a and 36b, the top of the linkage 34a holding the pivot, the master linkage 110 is moved 200 units.

Returning now to the original example, where the three tanks of equal height divide the 600 barrels total capacity in proportion to cross-sectional areas for the respective tanks 11a, 11b and 11c, of 280 sq. ft., 224 sq. ft., and 168 sq. ft., or respective capacities of 250 barrels, 200 barrels, and 150 barrels, calibration can be made for these disparities from equal volumes in the following manner: The distance along the lever 32 from compartment wall pivot to linkage 34a should be such that the linkage 34a moves downwardly 750 units in a five foot drop of the respective tank float 18 of the tank 11a, to be transmitted by the "three unit evener" bars 36, 37, as a 250 unit movement of the master linkage 110 to be recorded as a 250 barrel change on the recorder dial face.

As to the adjustment for measurement of the tank 11b, of 200 barrels for a five foot depth, adjustment should be as hereinabove described for the tank 11b of the same volume and depth.

As to the adjustment for measurement of the tank 11c of 150 barrel volume for a five foot depth, the distance along the lever 32 from compartment wall pivot to the linkage 34c should be such that this linkage 34c will move downwardly 450 units in a five foot drop of the respective float 18 of the tank 11c, to be transmitted by the "three unit evener" bars 37, 36, as a 150 unit movement of the master linkage 110 to be recorded as a 150 barrel change on the recorder dial face.

An example may be considered where a taller tank, 8 feet in depth, and of 150 barrels capacity, is substituted in the arrangement of FIGS. 1 and 2, in place of the tank 11c. In this case the float 18 for this tank would be lowered 8 feet instead of five feet in the previous example, the block 33 on the lever 32 for the compartment 31 for this tank being moved until the linkage 34c is moved 450 units of travel. Thus the "three unit evener" bars 37, 36 would move to accomplish 150 units of travel in the master linkage 110 which would result in the recorder needle 101 recording 150 barrels change on the dial face 103.

In the course of calibration and usage of the apparatus hereinabove described, it is pointed out that it is not necessary to compensate for small or negligible trigonometric functions. For instance, the angular movement of the levers 32 is so small in practicality, over the range of operation, that any factors which otherwise might be projected, in the course of translating angular movement into linear movement, are negligible. In fact, all throughout this apparatus no compensations, corrections, or special calibrations are necessary in all cases where angular movement is translated to linear movement, or vice versa, but rather the travel involved results in only minute trigonometric factors which are inconsequential.

The apparatus disclosed can be converted in various ways and calibrated in various directions, and the same effective results obtained. For instance the conduits 29a and 29b may be interchanged to connect into the respective bottoms and tops of the compartment 31 and the needle 101 moved to the left of the center of the recorder 35 to move clockwise as total volume increases. Otherwise, with the conduits 29a and 29b connected as shown in the drawings, the casings 21 may be dropped to the level of the bottoms of the tanks, in which case the needle 101 would have to be moved to the left of the center of the recorder 35 to move clockwise as total volume increases, as in the immediately preceding example.

A preferred embodiment of the invention (FIGS. 9–13), may be provided which does not require housed bellows, and which does not operate on the principle of translating movement responsive to changes in hydraulic head between that head acting against a floated flexible sack in a container whose volume is to be measured and the hydraulic head reflected from a reference elevation. In this preferred form of the invention, one hydraulic liquid system is omitted altogether and simple atmospheric air takes the place thereof; the other hydraulic liquid system being changed to a system requiring liquid to extend from the floated flexible sack interior to a reservoir located upon, or in close proximity to the tank containing the float; the liquid in the adjacent reservoir being counterpoised against reservoir air.

Then, instead of two hydraulic liquid lines extending to the respective interior and exterior of a housed bellows, a single small capillary tube alone extends from the reservoir to carry instument air to the interior of the bellows. In this improved embodiment the liquid, as oil, within the sack and extending through a short tube length to the lower part of the reservoir, acts as a liquid piston drive against the instrument air in the upper part of the reservoir and extending through a small capillary tube to the interior of the bellows, wherever it may be located.

In addition to eliminating one hydraulic liquid system, from the reference elevation, this embodiment consequently eliminates the bellows housing or container; since atmospheric air alone is the reference medium that is counterpoised against the bellows exterior; such medium also being counterpoised against the exterior of the floated flexible sack. Noticeably, with this system, only the instrument air has to be extended from the vicinity of its respective tank to the distant locations where it is usually expedient to provide the respective bellows which are connected in manner to transfer their messages via the bellows levers aforesaid, as arranged to actuate distant instruments and indicia.

Thus, with this improved system requiring one capillary air tube from each tank to a respective bellows, the problems of gravity (as occurring in the use of the two opposed hydraulic liquid systems) are eliminated.

Figures 9, 10, 11, 12, 13:
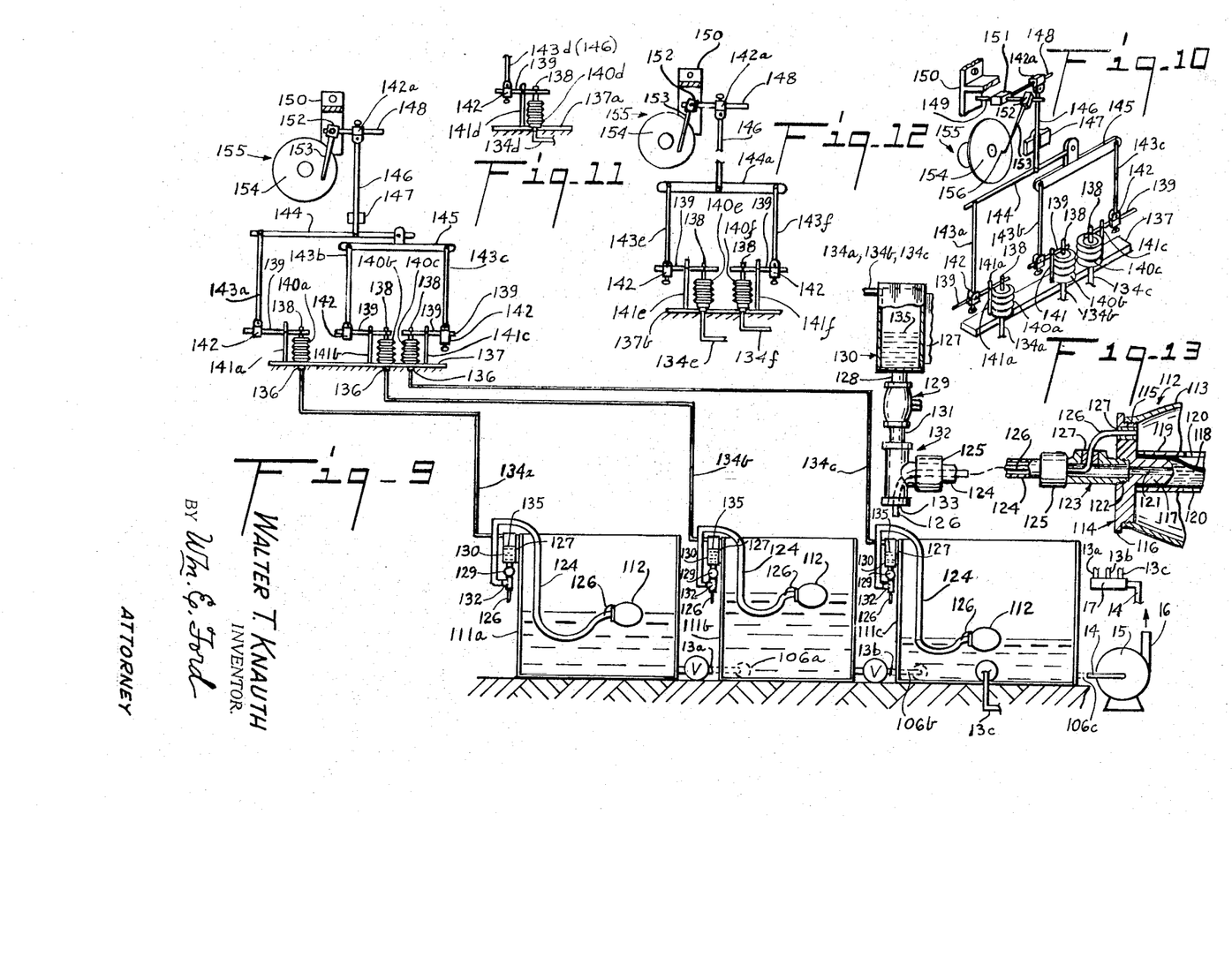
FIG. 9 is an elevational view, partially diagrammatic, showing three tanks and apparatus comprising a preferred embodiment of the invention, the apparatus including means connecting with a recorder in manner that the total volume of the liquid in the three tanks at any instant is recorded cumulatively.
FIG. 10 is an isometric view, partially diagrammatic, showing the three bellows for the three tanks and the levers therefrom, and also a form of leverage mechanism whereby connection is made to a recorder in manner that the recorder indicates cumulatively the total volume of liquid in the three tanks, in correspondence with the arrangement disclosed in FIG. 2.
FIG. 11 is a fragmentary elevational view, partially diagrammatic, showing the apparatus for connecting the compartment of a single liquid tank to the leverage which actuates a recorder needle.
FIG. 12 is a fragmentary elevational view, partially diagrammatic, showing the apparatus for connecting the liquid compartments of two tanks to the leverage which actuates a recorder needle to indicate the total volume of liquid in the two tanks.
FIG. 13 is a fragmentary elevational view, partially diagrammatic, showing a typical float-to-reservoir construction, to illustrate the opposing of atmospheric air against the hydraulic liquid, and to illustrate the employment of the hydraulic liquid against instrument air after the fashion of a liquid drive piston.

Referring now to the preferred embodiment of the invention, having the advantages hereinabove set forth, FIG. 9 shows three tanks or containers 111a, 111b, and 111c, through which passes liquid to be measured and the volumes in three tanks at any time totalized. The liquid usually measured and totalized is oil well drilling mud or circulating fluid, and for purposes of illustration the tanks 111a, 111b, and 111c may be assumed each to have a different cross-sectional area. A float 112 is shown floated in each tank or vessel, such float corresponding in general construction and function to the float 18 shown in detail in FIG. 5.

The shell 113 of the float 112 has a closure flange 114 which is externally threaded at 115 inwardly of its head 116 and the reduced diameter shank 117 comprising the innermost portion has fitted thereon the neck of a flexible sack 118, corresponding with the sack 27a shown in FIG. 5. A protective sleeve on tube 119, corresponding with the tube or guard 26 shown in FIG. 5, is press-fitted over the neck of the sack 118 to firmly connect the sack 118 and tube 119 over the shank 117. Noticeably, openings 120 are provided in the tube or guard sleeve 119 corresponding with the slots or opening 26a shown in FIG. 5, and these openings 120 may be covered with wire mesh, not shown, should this be desirable.

A bore 121 and internally threaded counterbore 122 are provided centrally through the closure flange 114, and a special T-shaped fitting 123 has one leg threadably connected into the counterbore 122, the opposite leg of the T 123 having a flexible tubing 124 connected thereto by a conventional hose or connection fitting 125.

A small diameter or capillary tube 126 has one end connected by means of a bushing 127 press-fitted into the closure flange 114, whereby atmospheric air may pass into the float 112 and through the openings 120 to bear upon the exterior of the flexible sack 118.

Outwardly of the flange 114 the air tube 126 is passed through a bushing 127 which is press-fitted into the central leg of the tie 123 and thence the air tube 126 is passed on through the T 123 and connection fitting 125, and into the flexible tubing 124 to pass therealong as a core, as will be described.

As the last step of assembly to complete a float 112, the internally threaded neck of the float shell 113 is threaded upon the externally threaded flange portion 115, so that the guard tube or sleeve 119 and the flexible sack 118 therewithin, are housed within the hollow shell 113. The liquid in the sack 118 may be conventional hydraulic cylinder oil, or any suitable liquid, and such extends through the bore 121 and through the T 123 and flexible tubing 124, outwardly of the air tube core 126 therein to the general location of a reservoir 130 for each tank, and to be described hereinbelow in detail.

Each reservoir 130 may be mounted by any suitable means, as a bracket 127, indicated in FIG. 9 as extending from a side of a tank 111a, 111b, 111c, while a bottom inlet 128 is connected to the bottom of the reservoir 130 to admit the liquid, as oil thereinto. A valve 129 is connected to the lower end of the bottom inlet nipple 128, and a nipple 131 extends from the lower end of the valve 129 to connect into the upper leg of a conventional T 132. The flexible tubing 124 from the float 112 is connected by means of a conventional fitting 125 to the central leg of the T 132, while the inner or air capillary tube 126 is led through the flexible tubing end connection fitting 125 and down through a closure bushing 133, press-fitted into the lower leg of the T 132 as its bottom closure. The air tube 126 terminates below the T 132, preferably in a suitable protected place where it may pick up clean, atmospheric air to bear, at the other end of the air tube 126, upon the flexible sack 118.

Within each reservoir 130 the hydraulic liquid 135 stands lowest when the float 112 rests on the bottom of a respective tank 111a, 111b, 111c, in which case the flexible sack 118 is at its fullest expansion and bellies out, as into the slots 120 indicated in FIG. 13. Conversely, when a respective tank is full so that the float 112 therein floats at the top, the liquid 135, as oil, comprised by the liquid drive piston system, rises to its highest point in its respective reservoir 130 and drives part of the instrument air therefrom to extend through its respective small diameter capillary tube 134a, 134b, 134c from the top of its respective reservoir 130 to its respective bellows 136a, 136b, 136c, to be hereinbelow described in detail.

The reservoirs 130 for each tank, may be mounted on respective sides thereof, as indicated in FIG. 9, as by the aforesaid brackets 127. As first installed, the capillary tubes 134a, 134b, 134c for instrument air are not connected into the reservoirs 130, which are open to the atmosphere. With the respective valves 129 temporarily closed, the reservoirs are filled with the liquid of the system, as instrument oil, to some point about ¾" from the tops thereof. Also the liquid, as instrument oil, may be used in each case partially to fill the sack within the float and to fill the annular space within the flexible tubing 124 around the air tube 126; the tubing 124 being connected to the valve 129 as shown in FIGS. 9 and 13. Then the valve 129 may be opened and the float 112 raised and lowered with relation to the reservoir 130 until the oil or liquid within the reservoir occupies say two-thirds (⅔) or three-fourths (¾) of the volume thereof. This raising and lowering of the float also serves to work the air bubbles out of the instrument oil.

At this point the tops of the reservoirs, if opened, are closed, and for each reservoir 130 a small diameter capillary tube, for instrument air, is installed, the capillary tubes 134a, 134b, 134c being shown installed in FIG. 9 and extending to respective bellows 140a, 140b, 140c, of the "belliphragm" type.

Such bellows are constructed substantially identically as the bellows 50 shown in FIG. 3, and the capillary tubes 134a, 134b, 134c are connected thereinto, by a suitable connection fitting 136 which is shown diagrammatically in the case of each bellows in FIG. 9 as extending below the base 137 on which the bellows are mounted by affixedly seating them thereon by any conventional means. An upright rod or connection member 138 extends centrally from the top of each bellows, and an end portion of a lever arm or beam 139 is pivotally connected to the member 138, as indicated diagrammatically in FIG. 9.

The base 137 supports three uprights 141a, 141b, 141c which provide the fulcrum members to which the respective lever arms or beams from the respective bellows 140a, 140b, 140c are substantially centrally, pivotally connected. The end portions of the respective beams or levers on the opposite sides of their fulcrums from their respective bellows, have connected thereto respective clamps 142 constructed in correspondence with the clamp 33 shown in FIG. 3, and to which the upright linkage member 34 in that figure is shown having its lower end pivotally connected.

The air that is entrapped in each tube and the bellows to which it is connected is at substantially atmospheric pressure at the time when the respective capillary tube is connected to its reservoir 130. Then, when the respective float is released to float on the liquid or drilling mud in its tank, the rise and fall of the float acts upon the instrument oil, sack via tube 124 to reservoir 130, as a liquid piston drive is comparably actuated. The instrument air, reservoir via capillary tube to bellows, is thus acted upon by the incompressible liquid, as oil, to transmit an air signal to the bellows, which reacts thereto in the manner of an ordinary pressure gauge rather than as a differential pressure gauge, as in the case of the form of invention shown in FIGS. 1–8, inclusive.

The air signal, or air action against the interior of a respective bellows, is a function of the elevation at which the respective float in the system floats in its respective tank; and bellows movement of the respective yoke or rod 138 thereon, is correspondingly in linear relation to such elevation which the float achieves upon the liquid to be measured in its respective tank.

Referring now to the action of the bellows 140a, 140b, and 140c, as connected in FIG. 9, the beams or levers 139 have scale graduations thereon, which correspond with the graduations on the lever 32 in FIG. 4, the graduations being in distances from the respective fulcrums as origins. Then, since the clamps 142 are slidably adjustable on the levers or beams 139 which pivot at their respective fulcrums, adjustment of the distance of respective clamps 142 from respective pivots may be in proportion to the cross-sectional areas of the tanks with volumes to be additively measured, as hereinabove described in the case of the three unit "evener" arrangement disclosed in the relationships of FIGS. 1 and 2.

Thus assuming the respective tanks 111a, 111b and 111c to be of the same height and of respective cross-sectional areas of 280 sq. ft., 224 sq. ft. and 168 sq. ft., thus to hold respectively, 250 barrels, 200 barrels, and 150 barrels when full, the respective clamps 142 will have to be moved on their beams 139 away from their respective fulcrums 141a, 141b, 141c, distances to locate the respective upright linkages 143a, 143b, 143c, proportionate to the respective areas and/or gallonage per unit depth.

Above the bellows 140a, 140b and 140c, shown in FIGS. 9 and 10, the arrangements, element for element, correspond with the arrangement of elements shown in FIGS. 1 and 2. Thus the linkage 143a, pivotally connected at its bottom to its respective clamp 142, is pivotally connected upwardly to an end of a cross-bar 144, corresponding with the cross-bar 36. Also, the linkages 143b and 143c, pivotally connected at their lower ends to their respective clamps 142, as adjusted in distances from their respective fulcrums, are connected upwardly to the end portions of a cross-bar 145, corresponding with the cross-bar 37. This cross-bar 145 in turn is shown pivotally connected substantially centrally to the end of the cross-bar 144 opposite the end portion to which the top of the linkage 143a is connected. Then, the lower end of a substantially vertically extending master linkage 146 is connected to the cross-bar 144, proportionately between its end portion connections, correspondingly as the master linkage 110, is connected to the cross-bar 36.

The master linkage 146 extends upwardly through a suitable guide bracket 147, corresponding with the guide bracket 26, and at its upper end the master linkage 146 is pivotally connected to a clamp 142a which is slidably adjustable along a rod 148 corresponding with the rod 98. Also a pivot rod 149, corresponding with the rod 99, extends from a wall bracket or mount 150 and passes through a block 151 into which the rod 148 is connected at right angles.

A connection block 152 is slidably positionable upon the rod 149, and is rotated to any oriented position thereon, and fixedly positioned by a set-screw, not shown, to place a needle or pin arm 153 affixed in the block 152, with its needle or recording pin point 156 in recording position or contact with the dial face 154 of a recorder 155. The recorder 155 is of the conventional type, hereinabove described with relation to FIGS. 1 and 2, the recorder being rotated at a given rate, while the needle arm point 156 moves across the face of the dial 154 from center to periphery and records a record thereon in terms of amplitude corresponding with the total volumes of liquid in the three tanks 111a, 111b, 111c. The functioning of the three unit "evener" to record an accurate total of volumes of the three tanks 111a, 111b, 111c, corresponds in function, element for comparable element, with the functioning set forth hereinbefore in columns 6-8, inclusive.

Referring now to FIG. 11, an arrangement is shown whereby the lever or beam 139 with one end portion pivotally connected to the rod 138 at the top of a bellows 140d is pivotally, centrally connected to a pivot upon a fulcrum or upright 141d, supported upon a base 137a, the opposite end portion, of the lever or beam 139, from the bellows connected end, having a clamp 142 slidably adjustably positioned thereon, thus to calibrate the motion of an upright linkage 143d, which is pivotally connected at its lower end to the clamp 142. Capillary air 134d, from the reservoir upon a tank, not shown, enters the bellows 140d and causes motion in direct proportion to the volume or gallonage in the respective single tank to be measured. In this form of the invention the linkage 143d carries out the function of the master linkage 146 which connects to the recording mechanism, as the rod 148 shown in FIGS. 9 and 10. Correspondingly this element is assigned reference numerals 143d (146).

As shown in FIG. 12 the levers or beams 139 have their respective bellows ends pivotally connected to respective rods or yokes 138 upstanding from bellows 140c and 140f which have instrument air supplied thereto by the capillary tubes 134c, 134f, from the reservoirs attached to two respective tanks, not shown, with volumes therein constantly to be measured and recorded. The bellows 140c, 140f, are supported on a suitable base 137b from which extend upwardly respective fulcrums or pivot rods 141e, 141f to which the respective beams or levers 139 are substantially centrally, pivotally mounted. Obviously with tanks of the same height and cross-sectional area, the lower ends of the upright linkages 143e, 143f will be pivotally connected to respective clamps 142 at equal distances from the respective fulcrum pivots 141e, 141f. The upper ends of the respective linkages 143e, 143f are indicated as being pivotally connected to the end portions of a cross-bar 144a, to the substantially central portion of which is pivotally connected the master linkage 146 which is clamp-connected at its upper end to the rod 148 or initial element of a recorder mechanism 155, hereinabove described. As has been set forth hereinabove, adjustment may be made for unequal cross-sectional areas, and consequent unequal gallonages per unit depth for totalizing the volumes of the two tanks, by setting the clamp 142 for the linkage having lower end pivotally connected, by positioning the clamps 142 for different respective beams or levers 139, proportionately different distances from their fulcrums.

As a matter of usage, it may be noted that the manifold 17, shown in FIGS. 1 and 9, may be omitted, and the tanks 11a, 11b and 11c and/or the tanks 111a, 111b, 111c, connected in tandem, as indicated in dotted lines by the reference numerals 106a, 106b and 106c, with dotted line lead lines. In this case the conduit 106c from the tank 11c or 111c connects into the suction line 14 of the pump 15.

In particular usages, any or all of the tanks 11a, 11b and 11c may be closed at the top and placed under the same or different pressures, in which case the float vent 20x is employed for each pressurized tank, rather than employing the vent 20a. Alternatively the casing vent 20b could be joined with the float vent of whatever description and in any manner that venting is done into the same pressure area.

Also, it is evident that this invention is employable to measure elevations rather than volumes, as, for example, to measure elevation changes in a drilling well circulating fluid or "drilling mud" pit or pits. In this case the respective recorder dial face 103 and/or the respective recorder dial face 154 would be calibrated to read in feet, inches, or fractions of feet, rather than in volumes.

The invention is not limited to the exact structures hereinabove disclosed, or to the exact methods of calibration or to the exact methods of constantly indicating volume or total volume, but other structures and methods of continuously indicating and/or recording volume or total volume are included, as long as such may fall within the broad spirit of the invention, and within the broad scope of interpretation claimed for and merited by the appended claims.

I claim:

1. A volume totalizer for constantly indicating the total volumes of liquids in a plurality of containers, said totalizer including apparatus comprising for each container, a float carrying a flexible sack with one side thereof subjected to the atmosphere, a fluid impermeable resilient means, a first conduit means connecting the other side of said float carried flexible sack with a first side of said resilient means, a case disposed at a predetermined elevation with relation to the bottom of the respective container and carrying a flexible sack with one side subjected to the atmosphere, a rigid compartment containing said resilient means, second conduit means connecting the other side of said cased flexible sack with the interior of said compartment, including the other side of said resilient means, hydraulic fluids of the same specific gravity comprising first and second hydraulic fluid systems and filling, respectively, the first conduit means between the other side of said float flexible sack and the first side of said resilient means, and the second conduit means between the other side of said cased flexible sack and the interior of said compartment, including the other side of said resilient means, a lever with the inner end pivotally connected to said resilient means, and means by which said lever extends sealably and pivotally through the wall of said compartment, said totalizer including an indicator and leverage means pivotally connected to the outer end of the lever from each compartment and to said indicator and adapted to calibrate lever movement with relation to said indicator whereby said indicator moves responsive to cumulative changes in the volumes and constantly indicates the total of the volumes.

2. A volume totalizer as claimed in claim 1, in which said fluid impermeable, resilient means comprises a bellows.

3. A volume totalizer for constantly indicating the total volume of liquids in a plurality of containers, said totalizer including apparatus comprising, for each container, a float carrying a flexible sack with one side thereof connected to the atmosphere, a stationary reservoir adjacent the container, a conduit with hydraulic fluid therein, said conduit connecting the other side of said sack to the lower end of said reservoir, fluid impermeable, resilient means disposed at location of measurement, capillary tube means from the upper end of said reservoir to said resilient means, instrument air extending from above said hydraulic fluid in said reservoir through said capillary tube to said resilient means and urged by said hydraulic fluid acting as a liquid piston to impart liquid piston drive impulses to actuate resilient means movement and in opposition to the action of atmospheric air upon said resilient means, a lever with an end pivotally connected to said fluid impermeable, resilient means, pivot means between the ends of said lever, said totalizer also including an indicator and leverage means pivotally connected to lever ends opposite said resilient means connected ends thereof, said leverage means also being pivotally connected to said indicator and adapted to calibrate lever movement with relation to said indicator whereby said indicator moves responsive to said cumulative changes in said volumes and constantly indicates the total of said volumes.

4. A volume totalizer as claimed in claim 3, in which said fluid impermeable, resilient means comprises a bellows.

5. A volume totalizer as claimed in claim 3, in which said leverage means is pivotally connected to a single lever end.

6. A volume totalizer as claimed in claim 3, in which said leverage means is pivotally connected to at least two lever ends.

7. A volume totalizer as claimed in claim 3, in which said lever ends opposite said resilient means are scale graduated from origins at said pivot means.

8. A volume totalizer as claimed in claim 3, in which the side of said flexible sack connected to the atmosphere is connected by tubular means passing within said first conduit means to the exterior of said respective container.

References Cited
UNITED STATES PATENTS

| | | | |
|---|---|---|---|
| 723,040 | 3/1903 | Schmitz | 73—316 |
| 1,394,336 | 10/1921 | Novick et al. | |
| 2,367,087 | 1/1945 | Beecher. | |
| 2,568,361 | 9/1951 | Pettigrove. | |
| 2,674,128 | 4/1954 | Beam. | |

FOREIGN PATENTS

| | | |
|---|---|---|
| 249,825 | 6/1926 | Great Britain. |
| 844,671 | 7/1952 | Germany. |

S. CLEMENT SWISHER, *Acting Primary Examiner.*